US007295978B1

(12) United States Patent
Schwartz et al.

(10) Patent No.: US 7,295,978 B1
(45) Date of Patent: Nov. 13, 2007

(54) SYSTEMS AND METHODS FOR USING ONE-DIMENSIONAL GAUSSIAN DISTRIBUTIONS TO MODEL SPEECH

(75) Inventors: Richard Mark Schwartz, Arlington, MA (US); Jason Charles Davenport, Walpole, MA (US); James Donald Van Sciver, Wayland, MA (US); Long Nguyen, Stoneham, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 1184 days.

(21) Appl. No.: 09/655,325

(22) Filed: Sep. 5, 2000

(51) Int. Cl.
*G01L 15/00* (2006.01)

(52) U.S. Cl. ............. 704/240; 704/238; 704/230; 704/250; 704/243

(58) Field of Classification Search ........... 704/240, 704/230, 243, 256, 250, 248, 238
See application file for complete search history.

(56) References Cited

U.S. PATENT DOCUMENTS

| 5,193,142 | A | * | 3/1993 | Zhao | 704/200 |
| 5,535,305 | A | * | 7/1996 | Acero et al. | 704/256 |
| 5,946,656 | A | * | 8/1999 | Rahim et al. | 704/256 |
| 5,991,442 | A | * | 11/1999 | Yamada et al. | 382/218 |
| 6,411,930 | B1 | * | 6/2002 | Burges | 704/240 |
| 6,526,379 | B1 | * | 2/2003 | Rigazio et al. | 704/245 |
| 6,539,351 | B1 | * | 3/2003 | Chen et al. | 704/236 |
| 6,591,235 | B1 | * | 7/2003 | Chen et al. | 704/236 |

FOREIGN PATENT DOCUMENTS

WO WO 00/46788 * 10/2000

OTHER PUBLICATIONS

Gales et al. "State-Based Gaussain Selection in Large Vocabulary Continuous Speech Recognition Using HMM's", IEEE Transactions on Speech and Audio Processing, vol. 7, No. 2, Mar. 1999.*
L. Rabiner, "A Tutorial on Hidden Markov Models and Selected Applications in Speech Recognition," Proceedings of the IEEE, vol. 77, No. 2, Feb. 1989, pp. 257-286.
S. Doh, "Weighted Principal Component MLLR for Speaker Adaptation," Dept. of Electrical and Computer Engineering and School of Computer Science, Carnegie Mellon University, 4 pages (undated).
K. Knill, "Use of Gaussian Selection in Large Vocabulary Continuous Speech Recognition Using HMMs," Proc. ISCLP-96, 1996, 4 pages.

* cited by examiner

*Primary Examiner*—Vijay B. Chawan (57) ABSTRACT

A system for recognizing speech receives an input speech vector and identifies a Gaussian distribution. The system determines an address from the input speech vector (610) and uses the address to retrieve a distance value for the Gaussian distribution from a table (620). The system then determines the probability of the Gaussian distribution using the distance value (630) and recognizes the input speech vector based on the determined probability (640).

44 Claims, 6 Drawing Sheets

SYSTEMS AND METHODS FOR USING ONE-DIMENSIONAL GAUSSIAN DISTRIBUTIONS TO MODEL SPEECH

GOVERNMENT CONTRACT

The U.S. Government has a paid-up license in this invention and the right in limited circumstances to require the patent owner to license others on reasonable terms as provided for by the terms of Contract No. N66001-97-D-8501 awarded by the U.S. Navy.

BACKGROUND OF THE INVENTION

A. Field of the Invention

The present invention relates generally to speech recognition and, more particularly, to systems and methods that model speech using a small number of one-dimensional Gaussian distributions.

B. Description of Related Art

Conventional speech recognizers identify unknown spoken utterances. Through a process known as training, the recognizer examines known words and samples and records features of the words as recognition models. The recognition models represent typical acoustic renditions of known words. In the training process, the recognizer applies a training algorithm to the recognition models to form the stored representations that it uses to identify future unknown words.

Conventional speech recognizers typically perform speech recognition in four stages. In the first stage, the recognizer receives unknown speech signals from a source, such as a microphone or network. In the second stage, the recognizer determines features that are based on a short-term spectral analysis of the unknown speech signal at predetermined intervals, such as 10 ms. These features, commonly referred to as "feature vectors," are usually the output of some type of spectral analysis technique, such as a filter bank analysis, a linear predictive coding analysis, or a Fourier transform analysis.

In the third stage, the recognizer compares the feature vectors with one or more of the recognition models that have been stored during the training process. During this comparison, the recognizer determines the degree of similarity between the feature vectors and the recognition models. In the final stage, the recognizer determines, based on the recognition model similarity scores, which recognition model best matches the unknown speech signal. The recognizer may then output the word(s) corresponding to the recognition model with the highest similarity score.

Many of today's speech recognizers are based on the hidden Markov model (HMM). The HMM provides a pattern matching approach to speech recognition. Conventional recognition systems commonly use two types of HMMs: discrete density HMMs and continuous density HMMs.

For discrete density HMMs, a conventional speech recognition system divides the feature space into a predetermined number of disjoint regions. Typically, the system computes one feature vector for every 10 ms of speech. The system determines, for each feature vector in the input speech, in which regions the feature vector lies. This usually does not require very much computation because the system performs this operation only once in each frame. Each probability distribution in the HMM then models the probability mass within each region. Thus, to obtain the probability of the input feature vector for a particular distribution, the speech recognition system need only look up the probability for the index of the region for the feature vector.

Continuous density HMMs model each distribution using a parametric function, such as a mixture of Gaussian distributions. That is, each distribution has its own set of multinomial Gaussian distributions that together form a probability density function. In this case, when a conventional speech recognition system compares an input feature vector with a probability distribution for a state, the system computes the weighted Euclidean distance from the input feature vector to each Gaussian distribution in the mixture distribution to determine the probability of the Gaussian distribution. This calculation may be represented by the following equation:

$$Dist = \sum_{D}^{i=1} \frac{x(i) - u(i)^2}{\sigma^2} \qquad \text{Eq. 1}$$

where x represents the input vector, u represents the mean of the Gaussian distribution, and σ represents the standard deviation of the Gaussian distribution (i.e., $\sigma^2$ represents variance). The system computes the distance for each dimension of the input vector. A typical input vector may have 45 dimensions. As a result, the distance computation often dominates the computation needed for speech recognition.

Continuous density HMMs generally provide more accurate recognition than discrete density HMMs, making them more desirable. Many conventional speech recognition systems share distributions among multiple states to decrease the amount of training data needed and to decrease the amount of computation needed during recognition. Many other conventional systems share sets of Gaussian distributions among several distributions, but permit the distributions to have different mixture weights. The distance computation, however, still dominates the computation time in both of these systems. Generally, the more Gaussian distributions an HMM has, the more accurate the speech recognition is, as long as there is enough training data available. In practice, training data is always limited.

As a result, a need exists for a system and method that reduces the amount of computation needed for speech recognition and reduces the amount of training data needed to model the Gaussian distributions.

SUMMARY OF THE INVENTION

Systems and methods consistent with the present invention address this need by providing a small number of one-dimensional Gaussian distributions from which all multi-dimensional Gaussian distributions may be constructed. This permits the Gaussian distribution likelihood computation to be performed by a table lookup operation, thereby reducing the computation time and the amount of training data needed.

In accordance with the purpose of the invention as embodied and broadly described herein, a system for recognizing speech receives an input speech vector and identifies a Gaussian distribution. The system determines an address from the input speech vector and uses the address to retrieve a distance value for the Gaussian distribution from a table. The system then determines the probability of the Gaussian distribution using the distance value and recognizes the input speech vector based on the determined probability.

In another implementation consistent with the present invention, a computer-readable medium stores instructions executable by one or more processors to perform a speech recognition method. The computer-readable medium includes instructions for obtaining an input speech vector having multiple dimensions; instructions for quantizing each of the dimensions of the input speech vector; instructions for identifying one or more one-dimensional Gaussian distributions; instructions for accessing a table to retrieve a distance value for each of the one or more one-dimensional Gaussian distributions using the quantized input speech vector; instructions for determining probabilities of the one or more one-dimensional Gaussian distributions using the distance values; and instructions for recognizing the input speech vector from the determined probabilities.

In yet another implementation consistent with the present invention, a computer-readable medium stores instructions executable by one or more processors to perform a speech recognition method. The computer-readable medium includes instructions for obtaining an input speech vector having multiple dimensions; instructions for identifying one or more one-dimensional Gaussian distributions; instructions for accessing a table to retrieve a distance value for each of the one or more one-dimensional Gaussian distributions and each of the dimensions of the input speech vector; instructions for determining probabilities of the one or more one-dimensional Gaussian distributions using the distance values; and instructions for recognizing the input speech vector from the determined probabilities.

In a further implementation consistent with the present invention, a method generates a table for use in Gaussian distribution probability calculations during speech recognition. The method includes identifying a set of means and variances; identifying one-dimensional Gaussian distributions to be used for recognition using the identified set of means and variances; determining distance values for the one-dimensional Gaussian distributions; and storing the distance values in the table.

In another implementation consistent with the present invention, a method generates a table for use in Gaussian distribution probability calculations during speech recognition. The method includes identifying a set of means and variances; identifying one-dimensional Gaussian distributions to be used for recognition using the identified set of means and variances; determining distance values for the one-dimensional Gaussian distributions for each of multiple dimensions of multiple speech vectors; and storing the distance values in the table.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention reduce the amount of computation required in large vocabulary speech recognition systems that use Gaussian distribution models. The systems and methods provide a small number of one-dimensional Gaussian distributions from which all multi-dimensional Gaussian distributions may be constructed. As a result, the systems and methods can perform the Gaussian distribution likelihood computation by a simple table lookup operation.

Exemplary System

Figure 1:
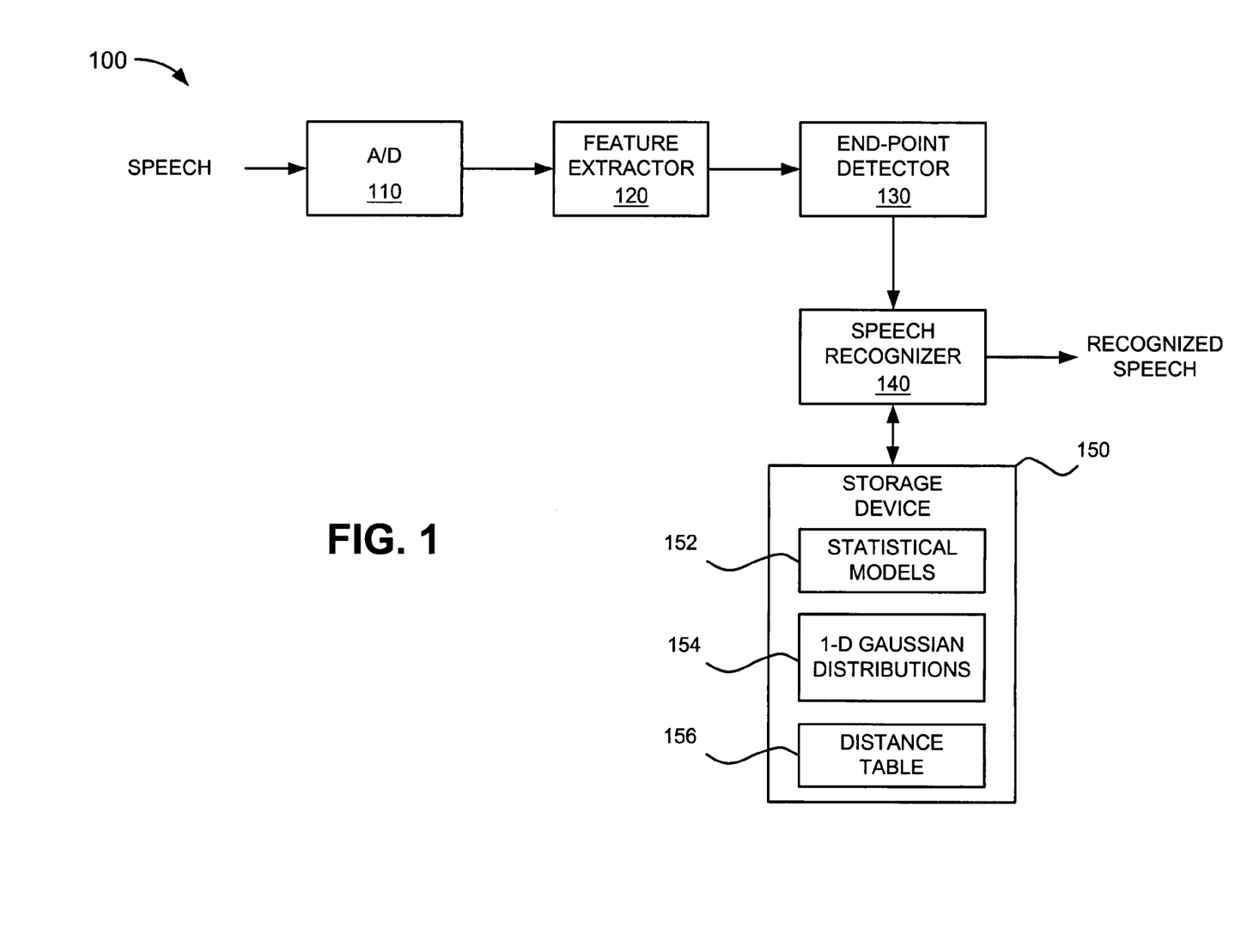
FIG. 1 is an exemplary diagram of a system in which systems and methods consistent with the present invention may be implemented.

FIG. 1 is a diagram of an exemplary system 100 in which systems and methods consistent with the present invention may be implemented. The system 100 may use hidden Markov model (HMM) techniques to perform speech recognition. According to an implementation consistent with the present invention, the system 100 includes an analog-to-digital (A/D) converter 110, a feature extractor 120, an end-point detector 130, a speech recognizer 140, and a storage device 150. The A/D converter 110 may include a conventional A/D converter that receives an input speech signal in analog form from, for example, a microphone or a network and converts it to digital form. The feature extractor 120 may include conventional mechanisms for organizing the received speech into frames of, for example, 10 ms and derives an input speech vector for each frame.

The end-point detector 130 may include conventional mechanisms that use the speech frames and input vectors to identify the beginning and end of the speech signal. The speech recognizer 140 may include a processor, microprocessor, or the like. The speech recognizer 140 performs speech recognition on the speech signal to identify the words that were spoken. The storage device 150 may store instructions and data used by the speech recognizer 140. The storage device 150 also may contain statistical models 152 for speech recognition, including many multinomial Gaussian distributions. Each dimension of the multinomial Gaussian distribution may be represented by a code for one of a small set of one-dimensional Gaussian distributions 154. In addition, the storage device 150 may contain a distance table 156 (described below) of precomputed distances associated with each one-dimensional Gaussian distribution.

Exemplary Processing for Creating Distance Table

Figure 2:
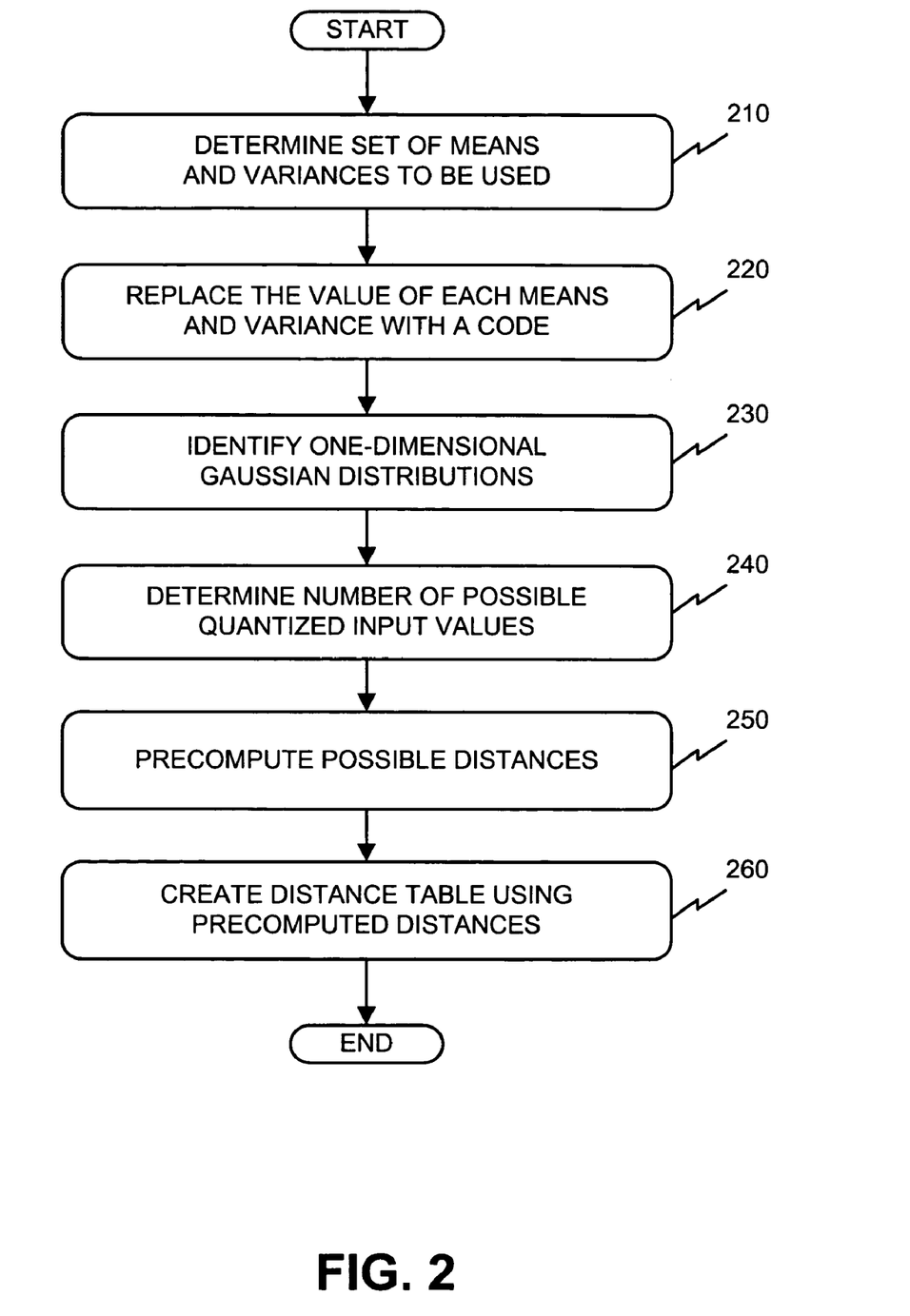
FIG. 2 is an exemplary flowchart of processing for creating a distance table in an implementation consistent with the present invention.

FIG. 2 is an exemplary flowchart of processing for creating a distance table 156 in an implementation consistent with the present invention. The processing will be described as a series of steps performed by a computer device, such as a personal computer. One or more of these steps, however, may be performed by one or more human operators.

Processing may begin with the computer device determining the set of means and variances to be used [step 210]. The computer device estimates the set of means and variances using standard estimation techniques for HMMs. The computer device then determines a small set of representative means and variances, using, for example, a quantizer. There are several known techniques for designing a quantizer for continuous values. The simplest is to divide the range of values into several equal sub-ranges. To reduce the quantization error, a conventional technique, such as the k-means clustering technique, can be used on a set of training data. In other implementations consistent with the present invention, other techniques are used to assign a set of representative values. To quantize the means in the model, the computer device may choose, for each estimated mean, a value that is closest to the estimated mean.

In the equation for distance (Eq. 1), variances are used in the denominator. Therefore, the distance is linearly sensitive to the logarithm of the variance. So after estimating all of the variances, the computer device may compute the logarithm of the variances. Then, the computer device may use the same procedure that was used for the means (e.g., k-means clustering) to determine a representative set of log variances. For each variance in the HMM, the computer device may choose the log variance that is closest to the log of the estimated variance.

The computer device may replace the value of each of the means and variances with a code, such as a three-bit code [step 220]. To minimize the amount of training data needed, the computer may: (1) reestimate the means and variances to maximize the likelihood of the data; (2) permit the data to be realigned to different states and different Gaussian distributions while keeping the assignment of mean codes and variance codes fixed; (3) reestimate the means and variances and then determine the Gaussian distributions that maximize the likelihood in each dimension; or (4) iterate the reestimation of the means and variances by assigning codes for the means and variances to the Gaussian distributions and reestimate the maximum likelihood of the means and variances given the code assignments.

The computer device may then identify the one-dimensional Gaussian distributions to be used for recognition using the determined set of means and variances [step 230]. Assume, for example, that the computer device determines that the set of means and variances includes eight different means and eight different variances. In this case, the computer device would identify sixty-four one-dimensional Gaussian distributions from the sixty-four different combinations of the means and variances. The computer device may assign a code to each of the Gaussian distributions based on the codes assigned to the means and variances. For example, the computer device may simply concatenate the three-bit means code and the three-bit variance code to create a six-bit code for each Gaussian distribution.

The computer device may determine the subset of possible quantized input values [step 240]. This subset of values may be selected through experimentation or may be randomly chosen. During runtime, the computer device may replace each value of the input vector with the nearest value in the subset of values. Assume, for example, that the subset includes thirty-two possible values.

The computer device may then compute the possible distances [step 250]. The number of possible distances for a dimension may be determined from the number of Gaussian distributions and the number of possible quantized input values (i.e., in the subset of possible input values). If there are sixty-four possible Gaussian distributions and thirty-two possible input values, the computer device may calculate 2,048 possible distances. The computer device may create the distance table 156 to store the possible distances [step 260]. The computer device may use a combination of the code for the Gaussian distribution and a code for the quantized input value as an address into the distance table 156. In an implementation consistent with the present invention, the computer device concatenates the Gaussian distribution code and the quantized input value code to determine the address for a particular distance in the distance table 156.

Figure 3:
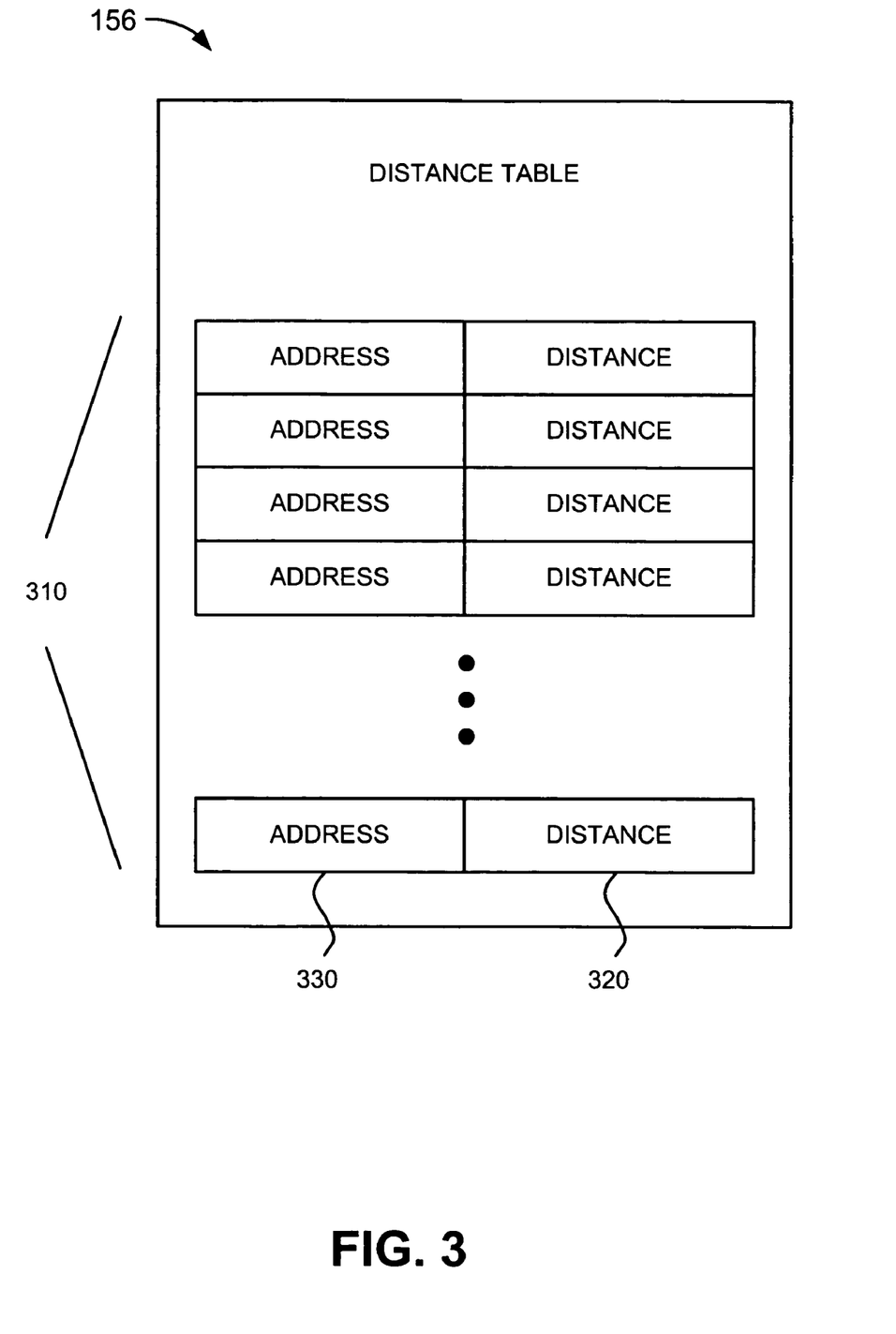
FIG. 3 is an exemplary diagram of a distance table that may be stored in the storage device of FIG. 1 in an implementation consistent with the present invention.

FIG. 3 is an exemplary diagram of the distance table 156 in an implementation consistent with the present invention. The distance table 156 may include multiple entries 310. Each of the entries 310 may store one of the possible distances 320 referenced by an address 330. The distance 320 and address 330 may be determined as described above.

Exemplary Runtime Processing

Figure 4:
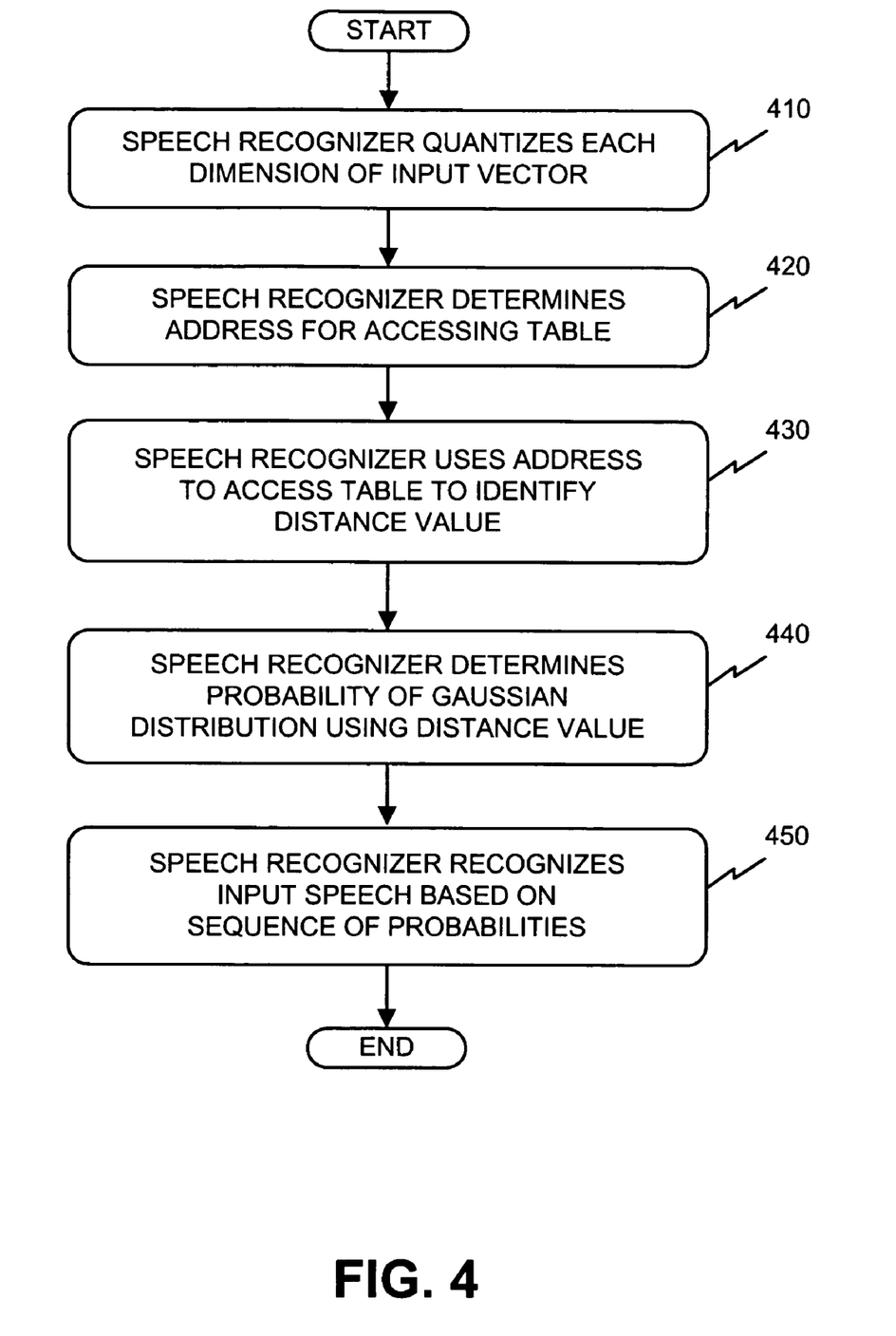
FIG. 4 is an exemplary flowchart of processing for recognizing input speech in an implementation consistent with the present invention.

FIG. 4 is an exemplary flowchart of processing for recognizing input speech in an implementation consistent with the present invention. Processing begins with the system 100 (FIG. 1) receiving input speech and creating an input vector for each portion of speech, such as each 10 ms frame of speech. The speech recognizer 140 may quantize each dimension of the input vector [step 410]. In other words, the speech recognizer 140 may select one of the input values in the subset of possible quantized input values for the input vector. For example, the speech recognizer 140 may select one of the quantized input values that is closest in value to the input vector. Other selection techniques may alternatively be used.

The speech recognizer 140 may then determine an address for accessing the distance table 156 [step 420]. To determine the address, the speech recognizer 140 may shift the code for the quantized input value by a number of bits equal to the number of bits for the code for a Gaussian distribution of interest and concatenate the two codes. The speech recognizer 140 may use the concatenated codes as the address into the distance table 156. Using the address, the speech recognizer 140 may access the distance table 156 to determine a distance value for the Gaussian distribution [step 430]. The distance value indicates to the speech recognizer 140 the probability of the Gaussian distribution [step 440].

The speech recognizer 140 may perform these steps many times for the different Gaussian distributions to identify one or more of the Gaussian distributions with the highest probabilities. The speech recognizer 140 may then recognize the inputted speech based on a sequence of the probabilities [step 450]. In other words, the speech recognizer 140 uses conventional techniques for determining what word or words were spoken based on the Gaussian distributions identified with the highest probabilities for each of the received frames of speech.

Alternate Processing for Creating Distance Table

Figure 5:
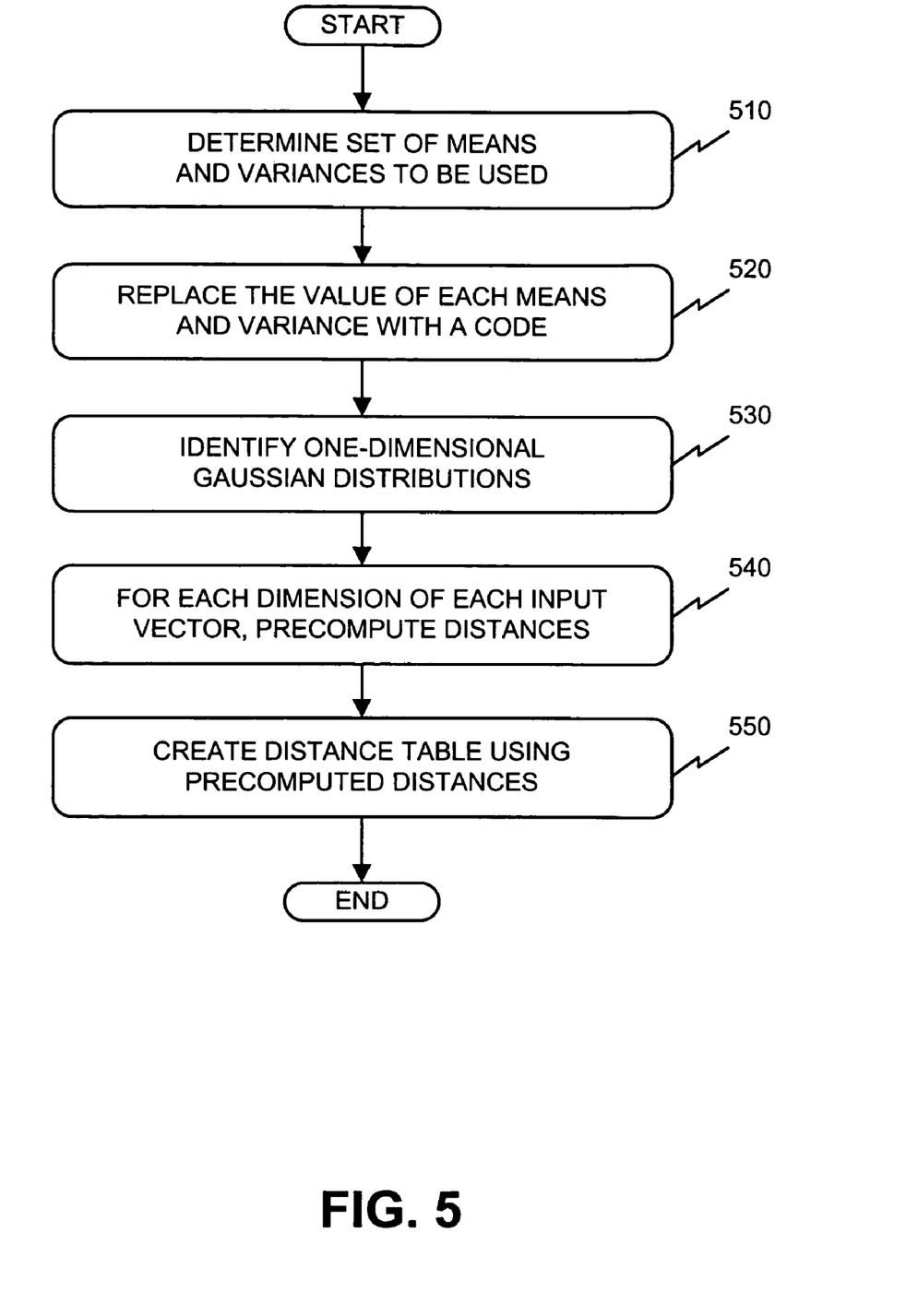
FIG. 5 is an exemplary flowchart of processing for creating a distance table according to an alternate implementation consistent with the present invention.

FIG. 5 is an exemplary flowchart of processing for creating a distance table 156 according to an alternate implementation consistent with the present invention. The processing will be described as a series of steps performed by a computer device, such as a personal computer. One or more of these steps, however, may be performed by one or more human operators.

This alternate implementation differs from the above-described implementation by not requiring the quantization of the input vector and in the way it uses the input feature vector to compute the distance. This alternate implementation is especially beneficial in large vocabulary applications in which the speech recognizer 140 (FIG. 1) computes a large number of Gaussian distributions for each input vector.

Processing may begin with the computer device determining the set of means and variances to be used. The computer device estimates the set of means and variances from training data. The procedures and methods used to determine the set of quantized means and variances is the same as described above with regard to FIG. 2. Therefore, steps 510-530 are identical to steps 210-230 described above with regard to FIG. 2.

The computer device may then precompute the weighted distance for each of the identified Gaussian distributions for each dimension of each input vector (e.g., every 10 ms frame) [step 540]. The computer device may use the actual floating point values for the means and variances for computing the distances. The number of distances computed may be determined from the number of Gaussian distributions and the number of dimensions of the input vector. If there are sixty-four possible Gaussian distributions and forty-five dimensions, the computer device may calculate 2,880 distances.

The computer device may create the distance table 156 to store the distances [step 550]. The distance table 156 may be configured as shown in FIG. 3. The computer device may use a combination of the code for the Gaussian distribution and the dimension number as an address into the distance table 156. In an implementation consistent with the present invention, the computer device may concatenate the Gaussian distribution code and the dimension number to determine the address for a particular distance in the distance table 156.

Exemplary Alternate Runtime Processing

Figure 6:
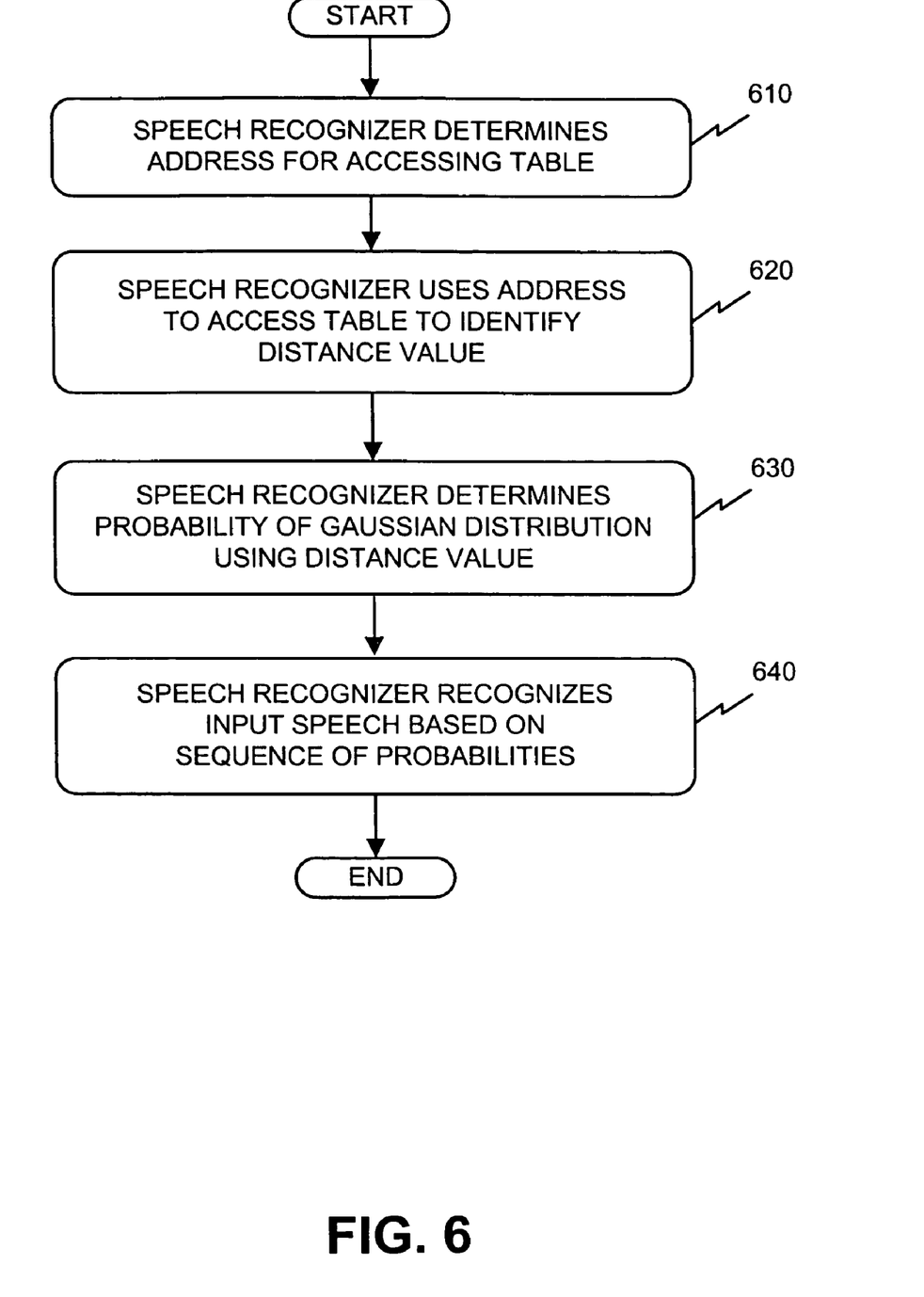
FIG. 6 is an exemplary flowchart of processing for recognizing input speech according to an alternate implementation consistent with the present invention.

FIG. 6 is an exemplary flowchart of processing for recognizing input speech according to an alternate implementation consistent with the present invention. Processing begins with the system 100 (FIG. 1) receiving input speech and creating an input vector for each portion of speech, such as each 10 ms frame of speech. For each dimension of the input vector, the speech recognizer 140 determines an address for accessing the distance table 156 [step 610]. To determine the address, the speech recognizer 140 may concatenate the code for a Gaussian distribution of interest and the dimension number. Using the address, the speech recognizer 140 may access the distance table 156 to determine a distance value for the Gaussian distribution [step 620]. The distance value indicates to the speech recognizer 140 the probability of the Gaussian distribution [step 630].

The speech recognizer 140 may perform these steps many times for the different Gaussian distributions and the different dimensions to identify one or more of the Gaussian distributions with the highest probabilities. The speech recognizer 140 then recognizes the inputted speech based on a sequence of the probabilities [step 640]. In other words, the speech recognizer 140 may use conventional techniques to determine what word or words were spoken based on the identification of the Gaussian distributions for each of the received frames of speech.

CONCLUSION

Systems and methods consistent with the present invention perform speech recognition with less computation and, therefore, in an expedited manner over conventional systems. The systems and methods permit a very large number of Gaussian distributions to be used in an HMM system, resulting in robust estimates of the parameters.

In addition, the systems and methods reduce the storage requirements for performing the required computations. According to the present invention, each dimension of each Gaussian distribution now requires only a few bits of storage (e.g., six bits) rather than a full floating point value for the mean and inverse variance (typically eight bytes). This greatly reduces the storage requirements (by a factor of ten in the given example), which is important when a very large number of Gaussian distributions are needed to achieve high accuracy.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for recognizing speech, comprising:
receiving, an input speech vector;
identifying a Gaussian distribution;
determining an address from the input speech vector, wherein the address includes a code representing the input speech vector and a code representing the Gaussian distribution;
using the address to retrieve a distance value for the Gaussian distribution from a table;
determining a probability of the Gaussian distribution using the distance value; and
recognizing the input speech vector based on the determined probability.

2. The method of claim 1, further comprising:
quantizing each of a plurality of dimensions of the input speech vector.

3. The method of claim 2, wherein the quantizing includes:
selecting an input value for the input speech vector from a subset of possible quantized input values.

4. The method of claim 2, wherein the determining an address includes:
concatenating a code representing the quantized input speech vector and a code representing the Gaussian distribution to form the address for accessing the table.

5. The method of claim 1, wherein the identifying includes:
identifying a plurality of Gaussian distributions.

6. The method of claim 5, further comprising:
repeating the steps of determining an address, using, and determining a probability for each of the Gaussian distributions; and
identifying one or more of the Gaussian distributions with highest probabilities.

7. The method of claim 6, wherein the recognizing includes:
recognizing the input speech vector using the one or more Gaussian distributions with the highest probabilities.

8. The method of claim 1, further comprising:
generating the table.

9. The method of claim 8, wherein the generating includes:
identifying a set of means and variances,
identifying one-dimensional Gaussian distributions to be used for recognition using the identified set of means and variances, and
determining distance values for the one-dimensional Gaussian distributions, and storing the distance values in the table.

10. The method of claim 9, wherein the identifying a set of means and variances includes:
estimating the set of means and variances, and
determining a representative set of the means and variances from the estimated set of means and variances.

11. The method of claim 9, wherein identifying one-dimensional Gaussian distributions includes:
determining the one-dimensional Gaussian distributions from different combinations of the means and the variances in the identified set of means and variances.

12. The method of claim 8, wherein the generating includes:
identifying a set of means and variances,
identifying one-dimensional Gaussian distributions to be used for recognition using the identified set of means and variances,
determining distance values for the one-dimensional Gaussian distributions for each of a plurality of dimensions of a plurality of speech vectors, and
storing the distance values in the table.

13. The method of claim 1, wherein the determining an address includes:
determining a separate address for each of a plurality of dimensions of the input speech vector.

14. The method of claim 13, wherein the determining a separate address includes:
concatenating a code representing a dimension number and a code representing the Gaussian distribution to form each of the separate addresses.

15. A system for recognizing speech, comprising:
means for receiving a plurality of input speech vectors representing the speech;
means for identifying one or more Gaussian distributions for each of the input speech vectors;
means for determining an address from each of the input speech vectors, wherein each address includes a code representing the input speech vector and a code representing the one or more Gaussian distributions;
means for using the addresses to retrieve distance values for the Gaussian distributions from a table;
means for determining probabilities of the Gaussian distributions using the distance values; and
means for recognizing the speech based on the determined probabilities.

16. A system for recognizing speech, comprising:
a memory configured to store a plurality of Gaussian distributions and a distance table; and
a processor configured to receive a plurality of input speech vectors representing the speech, associate one or more of the Gaussian distributions with each of the input speech vectors, determine an address from each of the input speech vectors, wherein each address includes a code representing the input speech vector and a code representing the one or more of the Gaussian distributions, access the distance table using the addresses to retrieve a distance value for each of the Gaussian distributions, determine probabilities of the Gaussian distributions from the distance values, and recognize the speech based on the determined probabilities.

17. The system of claim 16, wherein the processor is further configured to quantize each of a plurality of dimensions of the input speech vectors.

18. The system of claim 17, wherein when quantizing each of the dimensions of each of the input speech vectors, the processor is configured to select an input value for the input speech vector from a subset of possible quantized input values.

19. The system of claim 17, wherein when determining an address, the processor is configured to combine a code representing the quantized input speech vector and a code representing one of the Gaussian distributions to form the address for accessing the distance table.

20. The system of claim 16, wherein when determining probabilities, the processor is configured to identify one or more of the Gaussian distributions with highest probabilities and recognize the speech using the one or more Gaussian distributions with the highest probabilities.

21. The system of claim 16, wherein the processor is further configured to generate the distance table.

22. The system of claim 21, wherein when generating the distance table, the processor is configured to identify a set of means and variances, identify one-dimensional Gaussian distributions to be used for recognition using the identified set of means and variances, determine distance values for the one-dimensional Gaussian distributions, and store the distance values in the distance table.

23. The system of claim 22, wherein when identifying a set of means and variances, the processor is configured to estimate the set of means and variances and determine a representative set of the means and variances from the estimated set of means and variances.

24. The system of claim 22, wherein when identifying one-dimensional Gaussian distributions, the processor is configured to determine the one-dimensional Gaussian distributions from different combinations of the means and the variances in the identified set of means and variances.

25. The system of claim 21, wherein when generating the distance table, the processor is configured to identify a set of means and variances, identify one-dimensional Gaussian distributions to be used for recognition using the identified set of means and variances, determine distance values for the one-dimensional Gaussian distributions for each of a plurality of dimensions of a plurality of speech vectors, and store the distance values in the table.

26. The system of claim 16, wherein when determining an address, the processor is configured to determine separate addresses for each of a plurality of dimensions of the input speech vectors.

27. The system of claim 26, wherein when determining each of the separate addresses, the processor is configured to combine a code representing a dimension number and a code representing the Gaussian distribution.

28. A computer-readable medium that stores instructions executable by one or more processors to perform a speech recognition method, comprising:
instructions for obtaining an input speech vector having multiple dimensions;
instructions for quantizing each of the dimensions of the input speech vector;
instructions for identifying one or more one-dimensional Gaussian distributions;

instructions for accessing a table to retrieve a distance value for each of the one or more one-dimensional Gaussian distributions using an address including a code representing the quantized input speech vector and a code representing the one or more one-dimensional Gaussian distributions;

instructions for determining probabilities of the one or more one-dimensional Gaussian distributions using the distance values; and instructions for recognizing the input speech vector from the determined probabilities.

29. A computer-readable medium that stores instructions executable by one or more processors to perform a speech recognition method, comprising:

instructions for obtaining an input speech vector having multiple dimensions;

instructions for identifying one or more one-dimensional Gaussian distributions;

instructions for accessing a table to retrieve a distance value for each of the one or more one-dimensional Gaussian distributions and each of the dimensions of the input speech vector using an address including a code representing the input speech vector and a code representing the one or more one-dimensional Gaussian distributions;

instructions for determining probabilities of the one or more one-dimensional Gaussian.

30. A computer implemented speech recognition method, comprising:

receiving an input speech vector;

identifying a set of means and variances;

identifying one-dimensional Gaussian distributions to be used for recognition using the identified set of means and variances;

determining distance values for the one-dimensional Gaussian distributions;

determining a subset of possible quantized input values; and storing in a table for use in Gaussian distribution probability calculations during speech recognition of the input speech vector, each distance value with a corresponding address including a code representing one of the possible quantized input values and a code representing one of the one-dimensional Gaussian distributions.

31. The method of claim 30, wherein the identifying a set of means and variances includes:

estimating the set of means and variances, and determining a representative set of the means and variances from the estimated set of means and variances.

32. The method of claim 31, wherein identifying one-dimensional Gaussian distributions includes:

determining the one-dimensional Gaussian distributions from different combinations of the means and the variances in the identified set of means and variances.

33. A computer implemented speech recognition method, comprising:

receiving an input speech vector;

identifying a set of means and variances;

identifying one-dimensional Gaussian distributions to be used for recognition using the identified set of means and variances;

determining distance values for the one-dimensional Gaussian distributions for each of a plurality of dimensions of a plurality of speech vectors; and storing in a table for use in Gaussian distribution probability calculations during speech recognition of the input speech vector, the distance values with corresponding addresses, each address including a code representing a dimension number for one of the plurality of dimensions and a code representing a corresponding one-dimensional Gaussian distribution.

34. A method for determining multi-dimensional Gaussian distribution likelihood for an input speech vector using a small number of one-dimensional Gaussian distributions, comprising:

receiving an input speech vector having a plurality of dimensions;

identifying a one-dimensional Gaussian distribution for each dimension of the input speech vector;

determining, from a table, probabilities of the one-dimensional Gaussian distributions for the dimensions of the input speech vector using codes representing the one-dimensional Gaussian distributions and numbers representing the dimensions; and determining the likelihood of a multi-dimensional Gaussian distribution based on the determined probabilities.

35. The method of claim 34, wherein the identifying includes:

identifying a one-dimensional Gaussian distribution for each dimension of each multi-dimensional Gaussian distribution under consideration.

36. The method of claim 34, further comprising:

identifying a set of means and variances;

identifying the small number of one-dimensional Gaussian distributions from the identified set of means and variances;

determining distance values for the one-dimensional Gaussian distributions; and storing the distance values in the table.

37. The method of claim 36, wherein the identifying the small number of one-dimensional Gaussian distributions includes:

determining the codes representing the one-dimensional Gaussian distributions from codes representing the means and codes representing the variances in the identified set of means and variances.

38. A system for determining multi-dimensional Gaussian distribution likelihood for an input speech vector using a small number of one-dimensional Gaussian distributions, comprising:

a memory configured to store instructions for obtaining an input speech vector having a plurality of dimensions, identifying a one-dimensional Gaussian distribution for each dimension of the input speech vector, determining, from a table, probabilities of the one-dimensional Gaussian distributions for the dimensions of the input speech vector using codes representing the one-dimensional Gaussian distributions and numbers representing the dimensions, and determining the likelihood of multi-dimensional Gaussian distributions based on the determined probabilities; and a processor configured to execute the instructions in the memory.

39. The system of claim 38, wherein the instructions for identifying include:

instructions for identifying a one-dimensional Gaussian distribution for each dimension of each multi-dimensional Gaussian distribution under consideration.

40. The system of claim 38, wherein the memory is further configured to store instructions for identifying a set of means and variances, identifying the small number of one-dimensional Gaussian distributions from the identified set of means and variances, determining distance values for the one-dimensional Gaussian distributions, and storing the distance values in the table.

41. The method of claim 40, wherein the instructions for identifying the small number of one-dimensional Gaussian distributions include:

instructions for determining the codes representing the one-dimensional Gaussian distributions from codes representing the means and codes representing the variances in the identified set of means and variances.

42. A computer-readable medium that stores instructions executable by one or more processors to perform a method for determining multi-dimensional Gaussian distribution probabilities for an input speech vector using a small number of one-dimensional Gaussian distributions, comprising:

instructions for receiving an input speech vector having a plurality of dimensions;

instructions for identifying a one-dimensional Gaussian distribution for each dimension of the input speech vector;

instructions for determining, from a table, probabilities of the one-dimensional Gaussian distributions for the dimensions of the input speech vector using codes representing the one-dimensional Gaussian distributions and numbers representing the dimensions; and instructions for determining the probabilities of multi-dimensional Gaussian distributions based on the determined probabilities of the one-dimensional Gaussian distributions.

43. The computer-readable medium of claim 42, wherein the instructions for identifying include:

instructions for identifying a one-dimensional Gaussian distribution for each dimension of each of the multi-dimensional Gaussian distributions.

44. The computer-readable medium of claim 42, wherein the instructions for determining probabilities of the one-dimensional Gaussian distributions include:

instructions for using the one-dimensional Gaussian distribution codes and the dimension numbers as addresses for accessing the table.

\* \* \* \* \*